United States Patent
Kliesch et al.

(10) Patent No.: US 10,472,480 B2
(45) Date of Patent: Nov. 12, 2019

(54) BIAXIALLY ORIENTED UV-RESISTANT, SINGLE- OR MULTILAYER POLYESTER FILM WITH AT ANTIREFLECTIVE COATING

(71) Applicant: Mitsubishi Polyester Film GmbH, Wiesbaden (DE)

(72) Inventors: Holger Kliesch, Ginsheim-Gustavsburg (DE); Andreas Bork, Westhofen (DE); Claudia Lohre, Wiesbaden (DE); Ingo Fischer, Heistenbach (DE); Yavuz Ünker, Nieder-Olm (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 30 days.

(21) Appl. No.: 15/603,767

(22) Filed: May 24, 2017

(65) Prior Publication Data

US 2017/0342226 A1 Nov. 30, 2017

(30) Foreign Application Priority Data

May 30, 2016 (DE) .................. 10 2016 209 294

(51) Int. Cl.
| | | |
|---|---|---|
| *B32B 7/02* | (2019.01) | |
| *C08J 7/04* | (2006.01) | |
| *B29C 48/30* | (2019.01) | |
| *B29C 48/78* | (2019.01) | |
| *B29C 48/305* | (2019.01) | |
| *C08J 5/18* | (2006.01) | |
| *C09D 5/00* | (2006.01) | |
| *B32B 27/08* | (2006.01) | |
| *B32B 27/36* | (2006.01) | |
| *B29K 67/00* | (2006.01) | |
| *B29L 7/00* | (2006.01) | |
| *B29L 31/00* | (2006.01) | |

(52) U.S. Cl.
CPC .............. *C08J 7/042* (2013.01); *B29C 48/30* (2019.02); *B29C 48/305* (2019.02); *B29C 48/78* (2019.02); *B32B 27/08* (2013.01); *B32B 27/36* (2013.01); *C08J 5/18* (2013.01); *C08J 7/047* (2013.01); *C09D 5/006* (2013.01); *B29K 2067/00* (2013.01); *B29K 2995/0031* (2013.01); *B29K 2995/0053* (2013.01); *B29L 2007/00* (2013.01); *B29L 2031/7006* (2013.01); *B32B 2250/03* (2013.01); *B32B 2250/244* (2013.01); *B32B 2255/10* (2013.01); *B32B 2255/26* (2013.01); *B32B 2307/412* (2013.01); *B32B 2307/416* (2013.01); *B32B 2307/732* (2013.01); *C08J 2367/02* (2013.01); *C08J 2433/04* (2013.01)

(58) Field of Classification Search
CPC .......... B32B 2250/03; B32B 2250/244; B32B 2255/10; B32B 2255/26; B32B 2307/412; B32B 2307/416; B32B 2307/732; B32B 27/08; B32B 27/36; C08J 2367/02; C08J 2433/04; C08J 5/18; C08J 7/042; C08J 7/047; C09D 5/006
See application file for complete search history.

(56) References Cited

U.S. PATENT DOCUMENTS

| 6,497,921 B1 * | 12/2002 | Carbonell ............... B05D 1/18 427/430.1 |
| 6,797,358 B2 * | 9/2004 | Murschall ............... B32B 27/18 264/288.4 |

FOREIGN PATENT DOCUMENTS

| DE | 23 46 787 A1 | 3/1975 |
| DE | 10043785 A1 | 3/2002 |
| DE | 69731750 T2 | 2/2006 |
| EP | 0144948 A | 6/1985 |
| EP | 0769540 A2 | 4/1997 |
| EP | 2060392 A1 | 5/2009 |

OTHER PUBLICATIONS

J. A. Woollam et al., "Overview of variable-angle spectroscopic ellipsometry (VASE): I. Basic theory and typical applications," *Optical Metrology*, SPIE vol. CR72, pp. 3-28, Optical Metrology.

* cited by examiner

*Primary Examiner* — Lawrence D Ferguson
(74) *Attorney, Agent, or Firm* — ProPat, L.L.C.; Vinisha Joshi

(57) ABSTRACT

The present, invention relates to a highly transparent, biaxially oriented, UV-resistant polyester film which has, at least on one side, a coating that reduces reflection of visible light. The film of the invention is suitable for the production of energy-saving sheet materials for greenhouses, in particular for cultivation of plants with high light requirement, e.g. tomatoes. The film has specific transparency properties and high UV resistance. The invention further relates to a process for the production of the polyester film, and also to use of the film in greenhouses.

18 Claims, No Drawings

BIAXIALLY ORIENTED UV-RESISTANT, SINGLE- OR MULTILAYER POLYESTER FILM WITH AT ANTIREFLECTIVE COATING

CROSS-REFERENCE TO RELATED APPLICATIONS

This application claims priority to German Patent Application No. 10 2016 209 294.4 filed May 30, 2016 which is hereby incorporated herein by reference in its entirety.

FIELD OF THE INVENTION

The present invention relates to biaxially oriented UV-resistant, single- or multilayer polyester film with at antireflective coating (antiglare) on at least one side and with transparency of at least 93.5%

BACKGROUND OF THE INVENTION

Films for energy-saving sheet materials in greenhouses must comply with a large number of requirements. Firstly, that portion of the light that is required for plant growth should pass through the film/energy-saving sheet material, and during the night and in particular in the morning hours the energy-saving sheet material should moreover retain the heat that rises from the soil, not only by retarding convection but also by reflection of radiation within the greenhouse. In the absence of the energy-saving sheet material, energy consumption within the greenhouse increases, and it becomes more difficult to establish the ideal conditions of temperature and humidity. However, these materials generally have the disadvantage that solar radiation is interrupted by an additional layer which, both by absorption and by reflection, reduces the amount of light available. In the period around midday, the energy-saving sheet material can be raised, or indeed it can become necessary to use energy-saving sheet materials for cooling because of excessive incident light. However, the energy-saving sheet material is particularly important in the morning hours because the temperature required for plant growth must be achieved during this period and at the same time the amount of light made available must be maximized in order to ensure a high level of photosynthesis. However, in particular in the morning hours the sun is still at a small angle to the horizon, and this leads to even greater reflection at a film surface than when the sun is at a higher position. Reflection must therefore be reduced in particular at the main usage time of the materials.

The UV resistance of the film must moreover allow the energy-saving sheet material to remain in use in a greenhouse for at least 5 years while not exhibiting any significant yellowing or embrittlement or cracking on the surface, or undergoing any serious deterioration of mechanical properties, or suffering any significant loss of transparency.

SUMMARY OF ADVANTAGEOUS EMBODIMENTS OF THE INVENTION

The object of the present invention consisted in producing a biaxially oriented polyester film which features high transparency of at least 93.5%. A particular intention is that when the film is used outdoors for a number of years it does not exhibit significant yellowing, it exhibits no embrittlement or cracking of the surface, and also exhibits no impairment of mechanical and optical properties that is critical for its use. The film is moreover intended to be amenable to cost-effective production in the thickness range from 10 to 40 μm on existing single- or multilayer polyester film plants.

DETAILED DESCRIPTION OF ADVANTAGEOUS EMBODIMENTS OF THE INVENTION

The foregoing object is achieved via a single- or multilayer polyester film with transparency of at least 93.5%, where:
  the film (ignoring the coating) comprises a UV stabilizer in all layers,
  the film has an antireflective coating at least on one side.
    and the opposite side of the film likewise has an antireflective modification which is either likewise an antireflective coating or is an outer layer modification with refractive index lower than that of polyethylene terephthalate.

Total film thickness is at least 10 μm and at most 40 μm. The thickness of the film is preferably at least 14 μm and at most 23 μm and ideally at least 14.5 μm and at most 20 μm. If the thickness of the film is below 10 μm, the mechanical strength of the film is no longer sufficient to absorb, without excessive tensile strain, the tensions arising during use in the energy-saving sheet material. Above 40 μm, the film becomes too stiff, and when the sheet material is not in use and is wound up the resultant "roll of film" is excessively large and correspondingly casts an excessively large shadow.

The film has a base layer B. Single-layer films are composed only of this base layer. In the case of a multilayer embodiment, the film is composed of the (i.e. one) base layer and of at least one further layer which, according to positioning in the film, is termed intermediate layer (there being in each case here at least one further layer on each of the two surfaces) or outer layer (where the layer forms an external layer of the film). In the case of the multilayer embodiment, the thickness of the base layer is at least as great as the sum of the other layer thicknesses. It is preferable that the thickness of the base layer is at least 55% of the total thickness of the film and ideally at least 63% of the total thickness of the film. The thickness of the other layers, preferably of the outer layers, is at least 0.5 μm, preferably at least 0.6 μm and ideally at least 0.7 μm. The thickness of the outer layers is at most 3 μm and preferably at most 2.5 μm and ideally at most 1.5 μm. Below 0.5 μm, processing stability decreases, as also does thickness uniformity of the outer layer. Achievement of very good processing stability begins at 0.7 μm. If the outer layers become too thick, cost-effectiveness decreases because in order to ensure that properties (in particular UV resistance) are good, regrind should be added only to the base and if base-layer thickness is too low in comparison with total thickness the percentage of regrind that must be added to this layer in order to close the regrind circuit is then excessive. This can then also, by way of the base layer, have an adverse effect on properties such as UV resistance and transparency. The outer layers moreover generally comprise particles in order to improve slip properties (windability improvement). These particles lead to loss of transparency via back-scattering. If the proportion of the outer layers with these particles becomes excessive, it becomes markedly more difficult to achieve the transparency properties of the invention.

High outer-layer thicknesses of the outer layer optionally present with antireflective modification in the film lead to an undesired cost increase because of the relatively high UV stabilizer content which is required in copolymer-modified layers and is present in this layer (see below).

The film must moreover have low transmittance in the wavelength range from below 370 nm to 300 nm. It is preferable that at every wavelength in the stated range this is less than 40%, preferably less than 30% and ideally less than 15% (for the method see Test Methods). The film is thus protected from embrittlement and yellowing, and the plants and equipment in the greenhouse are moreover thus protected from UV light. In a preferred embodiment, transparency at from 390 nm to 400 nm is greater than 20%, preferably greater than 30% and ideally greater than 40%, because this wavelength range is also significantly effective for photosynthesis, and excessive filtering in this wavelength range would adversely affect plant growth. The low UV-permeability is achieved via addition of organic UV stabilizer. Low permeability to UV light protects the optionally present flame retardant from rapid destruction and severe yellowing. The organic UV stabilizer here is selected from the group of triazines, benzotriazoles or benzoxazinones. Particular preference is given here to triazines, because inter alia they have good thermal stability at the processing temperatures conventional for PET, from 275 to 310° C., and exhibit little loss due to gas evolution from the film. 2-(4, 6-Diphenyl-1,3,5-triazin-2-yl)-5-(hexyl)oxyphenol (TINUVIN® 1577) is in particular suitable. Most preference is given here to 2-(2'-hydroxyphenyl)-4,6-bis(4-phenylphenyl) triazines as marketed by way of example by BASF with trademark TINUVIN 1600™. If these materials are used, the preferred low transparencies below 370 nm can be achieved even with relatively small stabilizer concentrations, with simultaneous achievement of relatively high transparency at wavelengths above 390 nm.

The film, or in the case of a multilayer film at least one outer layer, preferably both outer layers, therefore comprises/comprise at least one organic UV stabilizer. Quantities of UV stabilizers added to the outer layer(s) or to the monofilm in one preferred embodiment are from 0.3 to 3% by weight, based on the weight of the respective layer. Particular preference is given to UV stabilizer content from 0.75 to 2.8% by weight. The outer layers ideally comprise from 1.2 to 2.5% by weight of UV stabilizer. In the multilayer embodiment of the film it is preferable that a UV stabilizer is also present in the base layer, alongside the outer layers, the content of UV stabilizer in % by weight, in the said base layer preferably being lower than in the outer layer(s). These stated contents in the outer layer(s) relate to triazine derivatives. If a UV stabilizer from the group of the benzotriazoles or benzoxazinones is used to some extent or entirely instead of a triazine derivative, the proportion replaced for the triazine component must be replaced by 1.5 times the quantity of a benzotriazole component or benzoxazinone component.

For the purposes of the invention, the quantity present of whitening polymers incompatible with the polyester main constituent, for example polypropylene, cycloolefin copolymers (COCs), polyethylene, uncrossed polystyrene, etc., is less than 0.1% by weight (based on the weight of the film) and ideally zero (0% by weight), because these severely reduce transparency and have a severe adverse effect on fire behaviour, and have a tendency towards severe yellowing on exposure to UV, and would therefore require considerable additional quantities of UV stabilizer, thus significantly impairing cost-effectiveness.

Base layer and outer layer(s) can comprise particles to improve windability. These inorganic or organic particles are by way of example calcium carbonate, apatite, silicon dioxides, aluminium oxide, crosslinked polystyrene, crosslinked polymethyl methacrylate (PMMA), zeolites and other silicates such as aluminium silicates, or else white pigments such as $TiO_2$ or $BaSO_4$. These particles are preferably added to the outer layers in order to improve film windability. When these particles are added, it is preferable to use silicon-dioxide-particles, because these have little transparency-reducing effect. The proportion of these or other particles in any layer is not more than 3% by weight and preferably less than 1% by weight and ideally less than 2% by weight in every layer, based in each case on the total weight of the relevant layer. In the case of a multilayer embodiment, it is preferable that these particles are added only to one or both outer layers and that only a small proportion thereof passes into the base layer by way of the regrind. The transparency reduction due to the particles required for winding is thus minimal. In one preferred embodiment with good windability, at least one external layer comprises at least 0.07% by weight of particles.

Fires in greenhouses are very costly, and the film must therefore have reduced flammability.

Achievement of fire behaviour suitable for energy-saving sheet materials in greenhouses requires no flame retardants if the contents of particles, and also white pigments and incompatible polymers, are within the preferred ranges, or more preferably within the particularly preferred ranges (the fire test classification then achieved by the film being 4 or better). If contents higher than the preferred contents are used in one of the groups mentioned, or if additionally improved fire behaviour is required for a particular greenhouse application, it has been found that the film moreover advantageously comprises a flame retardant based on organophosphorous compounds. These are preferably esters of phosphoric acid or phosphonic acid. It has been found that the phosphorus-containing compound here is advantageously part of the polyester (=included in the polymer). Phosphorus-containing flame retardants not included in the polymer, for example Adeka-Stab 700 (4,4'-(isopropylidenediphenyl)bis(diphenylphosphate)) not only have the disadvantage of loss of the flame retardant due to gas evolution during production but also have a very severe disadvantageous effect on the hydrolysis resistance of the film, i.e. of the polyester, with the result that in the hot, humid conditions within a greenhouse the film rapidly becomes brittle and the energy-saving sheet materials have to be replaced. These effects are significantly reduced by using phosphorus compounds incorporated into the polyester chain. The phosphorus here can be part of the main chain, as is the case for example when 2-carboxyethylmethylphosphinic acid is used (other suitable compounds being described by way of example in DE-A-23 46 787). However, particular preference is given to phosphorus compounds where the phosphorus is located in a pendant chain, because susceptibility to hydrolysis under greenhouse conditions is thus minimized. These compounds are preferably compounds of the formula (I):

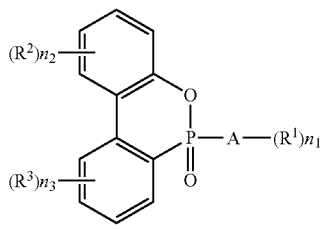

(I)

in which
R¹ is an ester-forming group selected from —COOR⁴, —OR⁵ and —OCOR⁶,
R² and R³ are selected mutually independently from halogen atoms, hydrocarbon groups having from 1 to 10 C atoms and R¹,
R⁴ is hydrogen or a carbonyl group or a hydrocarbon group having from 1 to 10 C atoms in which an OH group or carboxy group can be present,
R⁵ is hydrogen or a hydrocarbon group having from 1 to 10 C atoms in which an OH group or carboxy group can be present,
R⁶ is a hydrocarbon group having from 1 to 10 C atoms in which an OH group or carboxy group can be present,
A is a divalent or trivalent hydrocarbon group having from 1 to 8 C atoms,
n1 is 1 or 2, and
n2 and n3 is in each case 0, 1, 2, 3 or 4,
in particular in which this compound of the formula (I) has two ester-forming functional groups.

Bis(2-hydroxyethyl) 6-oxodibenzo[c,e][1,2]oxaphosphorin-6-ylmethylsuccinate (CAS No. 63562-34-5) is particularly suitable. Use of this monomer in the polyester production process gives polymers which have flame retardant included in the polymer and which have comparatively little susceptibility to hydrolysis and which moreover can be processed in a smooth-running film production process.

In one preferred embodiment, the quantity of flame retardant is adjusted in such a way that the proportion of phosphorus in the film is at least 500 ppm, preferably at least 1200 ppm and ideally at least 1600 ppm. The proportion of phosphorus is below 5000 ppm, preferably below 4000 ppm and ideally below 3000 ppm (ppm based on the respective weights of all the components used (not on the amount of substance in mol). If the proportion of phosphorus is below 500 ppm, the film burns too rapidly. As the proportion of phosphorus increases, the combustion rate decreases, but hydrolysis resistance also decreases. Above 5000 ppm, the maximal possible usage period of the film is one calendar year. Below 3000 ppm, hydrolysis rate is sufficiently low to eliminate any likelihood of decomposition due to hydrolysis during a number of years of usage.

The phosphorus content can be distributed uniformly across the layers or can differ. However, it has been found that the outer layers advantageously comprise at least 75% of the phosphorus concentration of the interior layer(s); it is preferable that they comprise the same phosphorus concentration, and ideally the outer layers comprise at least 5% more phosphorus than the base layer. This leads to particularly advantageous fire behaviour and the total quantity of phosphorus required is relatively small.

The transparency of the film, of the invention is at 93.5%; transparency is preferably at least 94.5% and ideally at least 95.3%. As transparency increases, plant growth in the greenhouse improves.

The transparency of the invention is achieved if the raw materials and additive contents and/or particle contents of the invention are used. However, the increase of transparency is achieved mainly via the antireflective layers present on both external sides of the film.

The film of the invention has, at least on one side, a coating of a material which has a lower refractive index than the polyester foil. Refractive index at a wavelength of 583 nm here in machine direction of the film is below 1.64, preferably below 1.60 and ideally below 1.58.

Particularly suitable materials are polyacrylates and silicones and polyurethanes, and also polyvinyl acetate. Suitable acrylates are described by way of example in EP-A-0144948, and suitable silicones are described by way of example in EP-A-0769540. Particular preference is given to coatings based on acrylate, because in the greenhouse these are not susceptible to bleeding of coating components or flaking of portions of the coating, which are much more commonly encountered when coatings based on silicone are used. In a particularly preferred embodiment, the coating comprises copolymers of acrylate and silicone.

In one preferred embodiment using an acrylate coating, the acrylate coating is composed of more than 70% by weight of methyl methacrylate and ethyl acrylate, particularly preferably more than 80% by weight of methyl methacrylate and ethyl acrylate and ideally more than 93% by weight of methyl methacrylate and ethyl acrylate repeat units. The other repeat units derive from other conventional monomers copolymerizable with methyl methacrylate, for example butadiene, vinyl acetate, etc. In one preferred embodiment, more than 50% by weight of the acrylate coating is composed of methyl methacrylate repeat units. In one preferred embodiment, the acrylate coating comprises less than 10% by weight, particularly less than 5% by weight and ideally less than 1% by weight, of repeat units comprising an aromatic structural element. Above 10% by weight content of repeat units having an aromatic structural element, the weathering resistance of the coating is significantly impaired.

The thickness of this/these coating(s) is in each case at least 60 nm, preferably at least 70 nm and in particular at least 78 nm, and is at most 130 nm, preferably at most 115 nm and ideally at most 110 nm. An ideal transparency increase in the desired wavelength range is thus achieved. In one preferred embodiment, the thickness of the coating is more than 87 nm, and particularly more than 95 nm. In this preferred embodiment, the thickness of the coating is preferably less than 115 nm and ideally less than 110 nm.

Within this narrow thickness range, not only is the transparency increase close to the optimum, but at the same time reflection of the UV and blue region of light is increased in comparison with the remainder of the visible spectrum. On the one hand, this saves UV stabilizer, but in particular it also leads to a shift of the blue/red ratio towards red. This achieves improved plant growth, increases flowering and fruiting, and reduces the incidence of stunted plant growth due to inadequate illumination.

The coating(s) are preferably applied to the film in-line before transverse stretching by means of known processes (e.g. reverse gravure roll or else Meyer bar), from preferably aqueous dispersion. In a particularly preferred embodiment, the coating comprises, based on dry weight, at least 1% by weight of a UV stabilizer, particular preference being given here to TINUVIN® 479, or TINUVIN® 5333-DW. HALS (Hindered Amine Light Stabilizers) are less preferred because during the regrind process (return of film residues from production) these lead to significant yellowing of the material and thus to reduced transparency.

That side of the film that is opposite to the antireflective coating described above also has an antireflective modification. In a preferred embodiment, this is likewise an antireflective coating applied to the film surface, as on the other film surface. This coating corresponds to the description of the opposite coating and in one preferred embodiment is the same as the opposite coating in respect of material and coating thickness. In another preferred embodiment, the coating corresponds to the description of the opposite coating but is not the same in respect of the material; this means by way of example that side 1 has a coating using an acrylate and side 2 has a coating using an acrylate-silicone copolymer.

The transparency values of >95.3% that are particularly preferred according to the invention can be achieved by using an antireflective coating applied on both sides.

In another preferred embodiment, on that side of the film that is opposite to the antireflective layer there is a further layer applied by coextrusion on the base layer B. This layer is composed of a polyester with a relatively low refractive index. The refractive index is below 1.70 at a wavelength of 589 nm in machine direction of the coating material, preferably below 1.65 and ideally below 1.60. This refractive, index is achieved in that, the polymer comprises at least 2 mol % of comonomer content, preferably at least 3 mol % and ideally at least 6 mol %. Below 2 mol % it is not possible to achieve the refractive index values of the invention. Comonomer content in a preferred embodiment is below 20 mol %, particularly preferably below 18 mol % and ideally below 16 mol %. Above 16 mol %, UV resistance is significantly poorer because of the amorphous nature of the layer, and above 20 mol % it is no longer possible to achieve the level of UV resistance that is achieved below 16 mol %, even with an increased quantity of UV stabilizer.

Any monomer other than ethylene glycol and terephthalic acid (and dimethylterephthalate) can be used as comonomer. The comonomer contents of the invention are always based on the entirety of all of the comonomers. It is preferable to avoid simultaneous use of more than 2 comonomers. Isophthalic acid is particularly preferred as comonomer. In a preferred embodiment, this outer layer comprises more than 8 mol % of IPA and ideally more than 10 mol % of IPA, but less than 20 mol % of IPA, preferably less than 19 mol % and ideally less than 15 mol % in relation to the dicarboxylic acid component of the polyester. In one preferred embodiment, a layer with comonomer content greater than 3 mol % (in relation to the polyester) moreover comprises at least 1.5% by weight, preferably more than 2.1% by weight, of organic UV stabilizer (as described above) in relation to the weight of the layer in order to compensate the poorer UV resistance of layers with increased comonomer content.

The base layer B is preferably composed of at least 80% by weight of a thermoplastic polyester (ignoring UV stabilizers, particles, flame retardants, polyolefins and other additives). Suitable polyesters are inter alia those made of ethylene glycol and terephthalic acid (=polyethyleneterephthalate, PET), of ethylene glycol and naphthalene-2,6-dicarboxylic acid (=polyethylene-2,6-naphthalate, PEN), and also of any desired mixture of the carboxylic acids and diols mentioned. Particular preference is given to polyesters composed of at least 85 mol %, preferably at least 90 mol % and ideally at least 92 mol %, of ethylene glycol units and terephthalic acid units. Use of naphthalene-2,6-dicarboxylic acid has no advantages over use of terephthalic acid, and therefore because naphthalene-2,6-dicarboxylic acid is more expensive it is usually omitted. The remaining monomer units do not derive from other aliphatic, cycloaliphatic or aromatic diols and, respectively dicarboxylic acids.

Examples of suitable other aliphatic diols are diethylene glycol, triethylene glycol, aliphatic glycols of the general formula HO—$(CH_2)$n-OH, where n is preferably less than 10, cyclohexanedimethanol, butanediol, propanediol, etc. Examples of suitable other dicarboxylic acids are isophthalic acid, adipic acid, etc. For smooth running and for the weathering resistance in greenhouse applications, it has been found that the film advantageously comprises less than 2% by weight, preferably less than 1.5% by weight of diethylene glycol or the units derived therefrom (in relation to the mass of the polyester of the layer). For the same reasons, it has been found that the film advantageously comprises less than 12 mol %, preferably less than 8 mol % and ideally less than 5 mol %, of isophthalic acid (IPA) in relation to the dicarboxylic acid component of the polyester. It has moreover been found that the film advantageously comprises less than 3 mol %, ideally less than 1 mol %, of CHDM (1,4-cyclohexanedimethanol) in relation to the diol component of the polyester. It has moreover been found that the total content (based on the total weight of the film) of iosphthalic acid, diethylene glycol and CHDM is advantageously not greater than 7% by weight and ideally less than 6% by weight. If the content of the comonomers mentioned, in particular that of CHDM, does not exceed the limits mentioned, UV resistance of the energy-saving sheet materials produced from the film is significantly better than in embodiments where the limits are exceeded.

A polymer according to this description occurs not only in the base layer but also in the other layers of the film. An exception is provided in a preferred embodiment by the above-described reflection-reduction layer applied on the base layer B by coextrusion of that side on the film that is opposite to the antireflective layer. This comprises the quantities stated above of comonomers.

Selection of the SV value of the polyester used for production of the film of the invention is such that the SV value of the film is >600, preferably >650 and ideally >700. The SV value of the film here is <950 and preferably <850. If the SV value is below 600, the brittleness of the film causes frequent break-offs during film production. In final applications, furthermore, the rate of further viscosity deterioration is greater, with loss of flexibility of the films, leading to breakage. At lower SV value the mechanical strength values mentioned at a later stage below are moreover no longer reliably achieved. If the film is intended to have an SV higher than 950, the average SV of the polymers used would then likewise have to be at least 950. The very high viscosity of these in the melt of the extruder would then give rise to disproportionately high electrical currents during operation of the electrical motor's of the extruder, and pressure variations would arise during extrusion, making the process unreliable.

Production Process

The polyester polymers of the individual layers are produced by polycondensation either from dicarboxylic acids and diol or else from the esters of the dicarboxylic acids, preferably the dimethyl esters, and diol. SV values of polyesters that can be used are preferably in the range of 500 to 1300, where the individual values are relatively important but the average SV value of the raw materials used must be greater than 700 and is preferably greater than 750.

The particles, and also UV stabilizers, can be added before production of the polyester is concluded. To this end, the particles are dispersed in the diol, optionally ground, decantered or/and filtered, and added to the reactor, either in the (trans)esterification step or in the polycondensation step. In a preferred procedure a concentrated particle-containing or additive-containing polyester masterbatch can be produced by using a twin-screw extruder and diluted with particle-free polyester during film extrusion. It has been found here that masterbatches comprising less than 30% by weight of polyester are advantageously avoided. In particular, masterbatch comprising $SiO_2$ particles should comprise no more than 20% by weight of $SiO_2$ (because of gelling risk). Another possibility consists in adding particles and additives directly during film extrusion in a twin-screw extruder.

When single-screw extruders are used, it has been found that the polyesters are advantageously predried. When a twin-screw extruder with devolatization section is used, the drying step can be omitted.

The polyester or polyester mixture of the layer, or of the individual layers in the case of multilayer films, is first compressed and liquefied in extruders. The melt(s) is/are then shaped in a mono- or coextrusion die to give flat melt films, forced through a flat-film die and drawn off on a chill roll and on one or more take-off rolls, where the material cools and hardens.

The film of the invention is biaxially oriented, i.e. biaxially stretched. Biaxial orientation of the film is most frequently carried out sequentially. Orientation here is preferably carried out first in longitudinal direction (i.e. in machine direction=MD) and then in transverse direction (i.e. perpendicularly to machine direction=TD). Orientation in longitudinal direction can be carried out with the aid of two rolls running at different speeds corresponding to the desired stretching ratio. The transverse orientation process generally uses an appropriate tenter frame.

The temperature at which stretching is carried out can vary within a relatively wide range, and depends on the desired properties of the film. Stretching in longitudinal direction is generally carried out in the temperature range from 80 to 130° C. (heating temperature from 80 to 130° C.) and stretching in transverse direction is generally carried out in the temperature range from 90° C. (start of stretching) to 140° C. (end of stretching). The longitudinal stretching ratio is in the range from 2.5:1 to 4.5:1, preferably from 2.8:1 to 3.4:1. A stretching ratio above 4.5 leads to significantly reduced ease of production (break-off). The transverse stretching ratio is generally in the range from 2.5:1 to 5.0:1, preferably from 3.2:1 to 4:1. A transverse stretching ratio higher than 4.8 leads to significantly reduced ease of production (break-off) and should therefore preferably be avoided. For achievement, of the desired film properties it has been found that the stretching temperature (in MD and TD) is advantageously below 125° C. and preferably below 118° C. Before transverse stretching, one or both surfaces of the film can be in-line coated by the processes known per se. In-line coating can preferably serve to apply a coating in order to increase transparency (anti-reflective). During the heat-setting that follows, the film is maintained at a temperature of from 150 to 250° C. for a period of about 0.1 to 10 s under tension and, in order to achieve the preferred shrinkage values and elongation values, relaxed in transverse direction by at least 1%, preferably at least 3% and particularly preferably at least 4%. This relaxation preferably takes place in the temperature range from 150 to 190° C. In order to reduce transparency bow, the temperature in the first setting zone is preferably below 220° C. and particularly preferably below 190° C. For the same reason, furthermore, at least 1%, preferably at least 2%, of the total transverse stretching ratio should preferably relate to the first setting zone, where no further stretching usually occurs. The film is then wound up in conventional manner.

Other Film Properties

After the process described above, the shrinkage of the film of the invention in longitudinal and transverse direction at 150° C. is preferably below 5%, preferably below 2% and particularly preferably below 1.5%. The expansion value of this film at 100° C. is moreover less than 3%, preferably less than 1% and particularly preferably less than 0.3%. This dimensional stability can be obtained by way of example via suitable relaxation of the film before wind-up (see description of process). This dimensional stability is important for avoiding subsequent shrinkage of the strips during use in energy-saving sheet materials; the said shrinkage would lead to increased passage of air between the strips (reduced energy-saving effect). In the production of roller blinds, and also in energy-saving sheet materials, excessive shrinkage, and also excessive expansion, lead to undesired corrugation of the finished products.

The modulus of elasticity of the film of the invention in both film directions is moreover greater than 3000 $N/mm^2$ and preferably greater than 3500 $N/mm^2$ and particularly preferably (in at least one film direction) >4500 $N/mm^2$ in longitudinal and transverse direction. The F5 values (force at 5% tensile strain) in longitudinal and transverse direction are preferably above 80 $N/mm^2$ and particularly preferably above 90 $N/mm^2$. These mechanical properties can be established and maintained by varying the parameters of biaxial stretching of the film within the scope of the process conditions stated above.

Films with the mechanical properties mentioned do not suffer disproportionate elongation under tension during use, and remain amenable to good directional control.

For achievement of the transparency values of the invention it has moreover been found that the haze value of the film is advantageously below 20%, preferably below 8% and ideally below 3%. As haze value decreases, back-scattering of light, and resultant loss of transparency, also decreases. Compliance with the particle contents and polymer composition of the invention achieves these haze values.

Use

The films of the invention have excellent suitability as high-transparency convection barrier, in particular for the production of energy-saving sheet materials in greenhouses. The film here is usually cut into narrow strips from which, in combination with polyester yarn (which must also be UV-resistant) a woven fabric/laid screen is then produced which is suspended in a greenhouse. The strips made of film of the invention can be combined here with strips made of other films (in particular with films with a light-scattering effect).

Alternatively, the film itself (without textile) can be installed in a greenhouse.

Analysis

The following test methods were used to characterize the raw materials and the films:

Measurement of Median Particle Diameter $d_{50}$

Median particle size $d_{50}$ was determined with the aid of a Malvern MASTERSIZER® 2000. To this end, the particles to be used were dispersed in water and transferred into a cell which was analyzed in the test equipment, with size determination by means of laser scattering. The general procedure here is that the detector records an intensity image of the scattered laser light and the particle size distribution is calculated from the angle-dependent light intensity of the said image with the aid of a mathematical correlation function. Particle size distribution is characterized via two parameters, the median value $d_{50}$ (=measure of the position of the central value) and the extent of scattering SPAN98 (=a measure of particle diameter scattering). The test procedure was automatic, and also included mathematical determination of the $d_{50}$ value.

Measurements on the film produced by using these particles give a $d_{50}$ value that is lower than that of the particles used by from 15 to 25%.

UV/Vis Spectra and Transmittance at Wavelength x

The films were tested in transmission in a LAMBDA® 12 or 35 UV/Vis double-beam spectrometer from PerkinElmer USA. To this end, a flat sample holder was used to insert a film specimen measuring about (3×5) cm into the beam path, vertically with respect to the measurement beam. The measurement beam passes by way of a 50 mm Ulbricht sphere onwards to the detector, where intensity is determined in order to determine transparency at a desired wavelength.

Air is used as background. Transmittance is read at the desired wavelength.

Transparency

Transparency was measured in accordance with ASTM-D1003-61 (Method A) by means of a HAZE-GARD® Plus from BYK-Gardner GmbH, Germany.

Haze Value

Haze value was determined in accordance with the standard ASTM-D1003 by means of a HAZE-GARD® Plus from BYK-Gardner GmbH.

SV Value (Standard Viscosity)

Standard viscosity in dilute solution (SV) was measured by a method based, on DIN 53728 Part 3, in an Ubbelohde viscometer at $(25\pm0.05)°$ C. Dichloroacetic acid (DCA) was used as solvent. The concentration of the dissolved polymer was 1 g of polymer/100 ml of pure solvent. Dissolution of the polymer required 1 hour at 60° C. After this time, if the samples were not completely dissolved up to two dissolution attempts were made, in each case for 40 minutes at 80° C., and the solutions were then centrifuged for 1 hour at a rotation rate of 4100 $min^{-1}$. The dimensionless SV value is determined as follows from the relative viscosity ($\eta_{rel}=(\eta/\eta_s)$).

$$SV=(\eta_{rel}-1)\times 1000$$

The proportion of particles in the film or polymer was determined by ashing and corrected via an appropriate increase of input weight, ie.:

Input weight=(Input weight corresponding to 100% polymer)/[(100 particle content in % by weight)/100)]

Mechanical Properties

Mechanical properties were determined by way of a tensile test using a method based on DIN EN ISO 572-1 and -3 (test sample type 2) on film strips measuring 100 mm×15 mm.

Shrinkage

Thermal shrinkage was determined on square film samples with edge length 10 cm. The samples were cut out in a manner that gave one edge running parallel to machine direction and one edge running perpendicularly to machine direction. The samples were measured precisely (edge length $L_0$ being determined for each direction TD and MD: $L_{0\ TD}$ and $L_{0\ MD}$) and were heat-conditioned at the stated shrinkage temperature (in this case 150° C.) for 15 minutes in a convection oven. The samples were removed and measured precisely at room temperature (edge length $L_{TD}$ and $L_{MD}$). Shrinkage is attained from the following equation:

Shrinkage [%] in $MD=100\cdot(L_{0\ MD})/L_{0\ MD}$, and

Shrinkage [%] in $TD=100\cdot(L_{0\ TD})/L_{0\ TD}$

Expansion Value

The thermal expansion value was determined on square film samples with edge length 10 cm. The samples were measured precisely (edge length $L_0$), heat-conditioned at 100° C. for 15 minutes in a convection oven, and then measured precisely at room temperature (edge length L). The expansion value is attained from the following equation:

Expansion value [%]=$100\cdot(L-L_0)/L_0$ and was determined separately in each film direction.

UV Resistance

UV resistance was determined as described on page 8 in DE 69731750 which is hereby incorporated herein by reference (DE of WO9806575), weathering time being 2000 h instead of 1000 h, and the UTS value is stated in % of the initial value.

Flame Retardancy

A film sample measuring 30*30 cm was held at the corners by 2 clamps and suspended vertically. A point generally requiring attention is exclusion, at the location where the sample is suspended, of any air movement that causes noticeable movement of the sample. Extraction of air from above at a low flow rate is acceptable here. A flame was then applied from below in the middle of the lower side of the film sample. A commercially available cigarette lighter, or preferably a Bunson burner, can be used to apply a flame. The length of the flame here must be more than 1 cm and less than 3 cm. The flame was kept in contact with the film until the latter continued to burn (for at least 3 seconds) in the absence of the ignition flame. However, the maximal time for which the flame was kept in contact with the film, and moved to retain contact with the burning/shrinking film was 5 seconds. 4 ignition procedures were carried out.

Flame retardancy is evaluated in the Examples cited here by using the following classifications:

1=during 4 ignition procedures, ignition of film never continued for longer than 3 seconds.

2=the film ignited and after less than 15 seconds self-extinguished, and more than 30% of the area of the film remained.

3=the film ignited and after less than 20 seconds self-extinguished, and more than 30% of the area of the film remained.

4=the film ignited and after less than 40 seconds self-extinguished, and more than 30% of the area of the film remained.

5=the film ignited and after less than 40 seconds self-extinguished, and more than 10% of the area of the film remained.

6=the film ignited and burned for more than 40 seconds, or after self-extinguishment less than 10% of the area of the film remained.

Determination of Refractive Index as a Function of Wavelength

The refractive index of a film substrate and of an applied coating was determined as a function of wavelength by spectroscopic ellipsometry.

J. A. Woollam et al, Overview of variable-angle spectroscopic ellipsometry (VASE): I. Basic theory and typical applications, Proc. SPIE Vol. CR72, pp. 3-28, Optical Metrology, Ghanim A. Al-Jumaily; Ed.

To this end, the base film without coating or modified coextruded side is first analyzed. Reverse-side reflection is suppressed by using an abrasive paper with the smallest possible particle diameter (for example P1000) to roughen the reverse side of the film. The film is then subjected to measurement by a spectroscopic ellipsometer, in this case an M-2000 from J. A. Woollam Co., Inc., equipped with a rotating compensator. The machine direction of the sample is parallel to the light beam. The wavelength used for measurement is in the range from 370 to 1000 nm; the measurement angles are 65, 70 and 75°.

A model is then used to simulate the ellipsometric data $\psi$ and $\Delta$. The Cauchy model $$n(\lambda) = A + \frac{B}{\lambda^2} + \frac{C}{\lambda^4}$$

(wavelength $\lambda$ in µm) is suitable for this purpose in the present case. The parameters A, B and C are varied in such a way that the data provide the best possible fit with $\psi$ and $\Delta$ in the measured spectrum. The validity of the model can be checked by using the MSE value, which compares model with measured data ($\psi(\lambda)$ and $\Delta(\lambda)$) and should be as small as possible.

$$MSE = \sqrt{\frac{1}{3n-m}\sum_{i=1}^{n}[(N_{E,i} - N_{G,i})^2 + (C_{E,i} - C_{G,i})^2 + (S_{E,i} - S_{G,i})^2]} \cdot 1000$$

n=number of wavelengths, m=number of fit parameters, N=cos(2$\psi$), C=sin(2$\lambda$) cos($\Delta$), S=sin(2$\psi$) sin($\Delta$) [1]

The Cauchy parameters A, B and C obtained for the base film allow calculation of the refractive index n as a function of wavelength, with validity in the range of measurement from 370 to 1000 nm.

The coating, or a modified coextruded layer, can be analyzed analogously. The parameters of the film base are now already known, and should be kept constant in the modelling procedure. Determination on the coating of the coextruded layer also requires roughening of the reverse side of the film, as described above. The Cauchy model can likewise be used here to describe the refractive index as a function of wavelength. However, the respective layer is now present on the known substrate, and this is taken into account in the relevant evaluation software (CompleteEASE or WVase). The thickness of the layer influences the spectrum obtained, and must be taken into account in the modelling procedure.

EXAMPLES

Inventive Examples 1-3 and CE1-7

The polymer mixtures are melted at 292° C. and, via a flat-film die, applied electrostatically to a chill roll controlled to a temperature of 50° C. The film is then stretched longitudinally, and then transversely, under the following conditions:

| | | | |
|---|---|---|---|
| Longitudinal stretching | Heating temperature | 75-115 | ° C. |
| | Stretching temperature | 115 | ° C. |
| | Longitudinal stretching ratio | 3.8 | |
| Transverse stretching | Heating temperature | 100 | ° C. |
| | Stretching temperature | 112 | ° C. |
| | Transverse stretching ratio (inclusive of stretching in 1$^{st}$ setting field) | 3.9 | |
| Setting | Temperature | 237-150 | ° C. |
| | Duration | 3 | s |
| | Relaxation in TD at from 200 to 150° C. | 5 | % |
| Setting | Temperature in 1$^{st}$ setting field | 170 | ° C. |

The Examples (according to the invention) use the following raw materials:

PET 1=polyethyleneterephthalate made of ethylene glycol and terephthalic acid with SV value 820 and DEG content 0.9% by weight (diethylene glycol content as monomer).

PET 2=polyethyleneterephthalate with SV value 730, comprising bis(2-hydroxyethyl) 6-oxodibenzo[c,e][1,2]-oxaphosphorin-6-ylmethylsuccinate as comonomer, where the resultant phosphorus content in the polymer is 18 000 ppm.

PET 3=polyethyleneterephthalate with SV value 700, comprising 20% by weight of TINUVIN® 1577. The composition of the UV stabilizer is as follows: 2-(4,6-diphenyl-1,3,5-triazin-2-yl)-5-(hexyl)oxyphenol (TINUVIN® 1577 from BASF, Ludwigshafen, Germany). TINUVIN® 1577 has a melting point of 149° C. and is thermally stable at 330° C.

PET 4=polyethyleneterephthalate with SV value 700 and 15% by weight of SYLYSIA® 310 P silicon dioxide particles with $d_{50}$ 2.7 µm (produced by FUJI SILYSIA CHEMICAL LTD. Greenville N.C./USA). The SiO$_2$ was incorporated into the polyethyleneterephthalate in a twin-screw extruder.

PET 5=polyethyleneterephthalate with SV value of 710, comprising 25 mol % of isophthalic acid as comonomer.

Table 1 below collates the formulations, production conditions and resultant film properties:

TABLE 1

|  |  | Inventive Example 1 | Inventive Example 2 | Inventive Example 3 | CE1 | CE2 | CE3 | CE4 | CE5 |
|---|---|---|---|---|---|---|---|---|---|
| Layer | Film thickness | 15 | 15 | 15 | 15 | 15 | 15 | 15 | 15 |
|  | Thickness of A | 0.8 | 0.8 | 0.8 | 0.8 | 0.8 | 0.8 | 0.8 | 0.8 |
|  | Thickness of B | 13.4 | 13.4 | 13.4 | 13.4 | 13.4 | 13.4 | 13.4 | 13.4 |
|  | Thickness of C | 0.8 | 0.8 | 0.8 | 0.8 | 0.8 | 0.8 | 0.8 | 0.8 |
|  | Coating on side A | Dry thickness 96 nm. Acrylate and application method as in Example 1 of EP0144948 | Dry thickness 96 nm. Acrylate and application method as in Example 1 of EP0144948 | Dry thickness 96 nm. Acrylate and application method as in Example 1 of EP0144948 | Dry thickness 30 nm. Acrylate and application method as in Example 1 of EP0144948 | Dry thickness 30 nm. Acrylate and application method as in Example 1 of EP0144948 |  | Dry thickness 160 nm. Acrylate and application method as in Example 1 of EP0144948 |  |
|  | Coating on side C |  | Dry thickness 96 nm. Acrylate and application method as in Example 1 of EP0144948 | Dry thickness 96 nm. Acrylate and application method as in Example 1 of EP0144948 |  | Dry thickness 30 nm. Acrylate and application method as in Example 1 of EP0144948 |  | Dry thickness 150 nm. Acrylate and application method as in Example 1 of EP0144948 |  |
| Layer A | PET 1 | 89 | 89 | 77 | 89 | 89 | 89 | 89 | 34 |
|  | PET 2 |  |  | 12 |  |  |  |  |  |
|  | PET 3 | 10 | 10 | 10 | 10 | 10 | 10 | 10 | 15 |
|  | PET 4 | 1 | 1 | 1 | 1 | 1 | 1 | 1 | 1 |
|  | PET 5 |  |  |  |  |  |  |  | 50 |
| Layer B | PET 1 | 95 | 95 | 83 | 95 | 95 | 95 | 95 | 95 |
|  | PET 2 |  |  | 12 |  |  |  |  |  |
|  | PET 3 | 5 | 5 | 5 | 5 | 5 | 5 | 5 | 5 |
| Layer C | PET 1 | 34 | 89 | 77 | 34 | 89 | 89 | 89 | 34 |
|  | PET 2 |  |  | 12 |  |  |  |  |  |
|  | PET 3 | 15 | 10 | 10 | 15 | 10 | 10 | 10 | 15 |
|  | PET 4 | 1 | 1 | 1 | 1 | 1 | 1 | 1 | 1 |
|  | PET 5 | 50 |  |  | 50 |  |  |  | 50 |
| Transparency (centre of web) | in % | 94.3 | 95.5 | 95.5 | 92.8 | 92.1 | 90.8 | 93.2 | 93.1 |
| Haze value |  | 1.8 | 2 | 2 | 1.9 | 1.8 | 1.8 | 2 | 2 |
| 0V resistance based on UTS | in % | 65 | 75 | 66 | 64 | 74 | 77 | 75 | 64 |
| Flame test | Classifications | 4 | 4 | 2 | 4 | 4 | 4 | 5 | 4 |
| Modulus of elasticity in MD | N/mm$^2$ | 4200 | 4360 | 3950 | 4100 | 4200 | 4200 | 4360 | 4390 |
| Modulus of elasticity in TD | N/mm$^2$ | 4750 | 4800 | 4280 | 4600 | 4750 | 4750 | 4800 | 4680 |
| 85 in MD | N/mm$^2$ | 105 | 107 | 101 | 105 | 105 | 105 | 107 | 108 |
| F6 in TD | N/mm$^2$ | 114 | 116 | 103 | 113 | 114 | 114 | 116 | 112 |
| Shrinkage in MD | in % | 1.4 | 1.3 | 1.4 | 1.6 | 1.4 | 1.4 | 1.3 | 1.3 |
| Shrinkage in TD | in % | 0.2 | 0.3 | 0.4 | 0.3 | 0.2 | 0.2 | 0.3 | 0.1 |
| Expansion value in MD at 100° C. | in % | 0 | 0.1 | 0 | −0.1 | 0 | 0 | 0 | 0.1 |
| Expansion value in TD at 100° C. | in % | 0.1 | 0 | 0 | 0 | 0.1 | 0.1 | 0 | 0 |
| SV of film |  | 738 | 745 | 740 | 750 | 743 | 740 | 741 | 745 |
| Transparency minimum at from 390 to 400 nm |  | 81 | 85 | 85 | 81 | 85 | 77 | 85 | 79 |
| Transparency maximum at from 300 to 370 nm |  | 11 | 13 | 13 | 11 | 13 | 8 | 13 | 9 |
| Comments |  |  |  |  |  |  |  |  |  |

That which is claimed:

1. A single- or multilayer polyester film comprising, an antireflective coating on one side of said film, and an antireflective coating or an antireflective outer layer, with a lower refractive index than the refractive index of the film without the antireflective outer layer, disposed on that side of the film that is opposite to the side having an antireflective coating wherein the antireflective coating comprises polyacrylates and/or silicones and/or polyurethanes and/or polyvinyl acetate, and wherein said lower refractive index is at a wavelength of 589 nm in machine direction of below 1.64, and the film, with the exception of the coating(s), comprising a UV stabilizer in all layers, wherein the thickness of said antireflective coating is at least 60 nm and at most 130 nm, and wherein the film has a transparency of at least 93.5%.

2. Polyester film according to claim 1, wherein the film has a total thickness of at least 10 μm and at most 40 μm.

3. Polyester film according to claim 1, wherein the film has a transmittance in a wavelength range from below 370 nm to 300 nm of less than 40%.

4. Polyester film according to claim 1, wherein the film, or in the case of a multilayer film at least one outer layer, comprises an organic UV stabilizer.

5. Polyester film according to claim 4, wherein the film is a multilayer film comprising organic UV stabilizer in both outer layers.

6. Polyester film according to claim 4, wherein the organic UV stabilizer is one or more compounds selected from triazines, benzotriazoles or benzoxazinones.

7. Polyester film according to claim 4, wherein the organic UV stabilizer is 2-(4,6-diphenyl-1,3,5-triazin-2-yl)-5-(hexyl)oxyphenol and/or 2-(2'-hydroxyphenyl)-4,6-bis(4-phenylphenyl)triazine.

8. Polyester film according to claim 1, wherein the UV stabilizer is present in the film outer layer(s) or in a monofilm in a quantity of from 0.3 to 3% by weight, based on the weight of the respective layer.

9. Polyester film according to claim 1, wherein the film comprises less than 0.1% by weight, based on the weight of the film, of polymers incompatible with polyester.

10. Polyester film according to claim 1, wherein the film comprises a flame retardant based on organophosphorus compounds.

11. Polyester film according to claim 10, wherein the organophosphorus compound is an ester of phosphoric acid or phosphonic acid.

12. Polyester film according to claim 11, wherein the ester of phosphoric acid or phosphonic acid is bis(2-hydroxyethyl) 6-oxodibenzo[c,e][1,2]oxaphosphorin-6-ylmethylsuccinate.

13. Polyester film according to claim 10, wherein the flame retardant is present in a quantity that is adjusted in such a way that the film has a phosphorus content of at least 500 ppm.

14. Polyester film according to claim 13, wherein the film comprises outer layers including at least 75% of the phosphorus concentration of the interior layer(s).

15. Polyester film according to claim 1, wherein the antireflective coating comprises an antireflective coating material having a refractive index at a wavelength of 589 nm in machine direction of below 1.60.

16. Polyester film according to claim 1, wherein the antireflective coating comprises copolymers of acrylate and silicone.

17. Polyester film according to claim 1, wherein the antireflective coating has a thickness per coating of at least 87 nm and at most 115 nm.

18. Polyester film according to claim 1, wherein a further antireflective outer layer has been applied by coextrusion on that side of the film that is opposite to the side having the antireflective coating, said coextruded antireflective outer layer having a lower refractive index than the refractive index of the film without an antireflective outer layer, and the refractive index is below 1.70 at a wavelength of 589 nm in machine direction.

* * * * *